(12) United States Patent
DeVito

(10) Patent No.: US 8,261,682 B1
(45) Date of Patent: Sep. 11, 2012

(54) AUTO TAB CONTROL SYSTEM

(76) Inventor: Richard DeVito, Stuart, FL (US)

(*) Notice: Subject to any disclaimer, the term of this patent is extended or adjusted under 35 U.S.C. 154(b) by 521 days.

(21) Appl. No.: 12/573,592

(22) Filed: Oct. 5, 2009

Related U.S. Application Data

(60) Provisional application No. 61/102,515, filed on Oct. 3, 2008.

(51) Int. Cl.
*B63B 1/22* (2006.01)
*B63H 25/04* (2006.01)
*B63H 25/06* (2006.01)
*B63H 5/20* (2006.01)
*B63H 5/125* (2006.01)
*B63H 20/08* (2006.01)
*B60L 3/00* (2006.01)
*B60L 15/00* (2006.01)
*F16M 11/00* (2006.01)

(52) U.S. Cl. .......... 114/285; 701/21; 440/53; 440/61 D; 440/61 F; 440/61 G; 440/61 R; 440/61 T; 114/144 R; 114/162; 114/286; 248/642

(58) Field of Classification Search .................. 701/21; 440/1–6, 53, 61 D, 61 F, 61 G, 61 R, 61 T; 114/144 R, 162, 285, 286; 248/642

See application file for complete search history.

(56) References Cited

U.S. PATENT DOCUMENTS

| | | | | |
|---|---|---|---|---|
| 5,113,780 A * | 5/1992 | Bennett et al. | ............... | 114/286 |
| 5,385,110 A * | 1/1995 | Bennett et al. | ............... | 114/285 |
| 5,474,012 A | 12/1995 | Yamada et al. | | |
| 6,167,830 B1 | 1/2001 | Pilger | | |
| 6,354,237 B1 * | 3/2002 | Gaynor et al. | ............... | 114/286 |
| 6,745,715 B1 * | 6/2004 | Shen et al. | ................... | 114/284 |
| 7,311,058 B1 * | 12/2007 | Brooks et al. | ................. | 114/285 |
| 7,389,165 B2 * | 6/2008 | Kaji | .............................. | 701/21 |
| 7,543,544 B2 * | 6/2009 | Yap | ............................... | 114/273 |
| 8,145,370 B2 * | 3/2012 | Borrett | ............................ | 701/21 |
| 2008/0167768 A1 * | 7/2008 | Rubenstein et al. | ............ | 701/21 |

* cited by examiner

*Primary Examiner* — James Trammell
*Assistant Examiner* — Majdi Alsomiri
(74) *Attorney, Agent, or Firm* — Malin Haley DiMaggio Bowen & Lhota, P.A.

(57) ABSTRACT

A boat trim tab system having an automatic controller for positioning trim tabs to perform user selected preset functions or maintain previously used positions in response to real time operating conditions. The system is intended to be a stand alone system that is installed on a boat using a master control module to operate the trim tabs and a manual keypad to provide a user interface to the master control module. The system gathers real time data from a variety of onboard sources and uses the data to determine the optimal position of the trim tabs to enhance boat performance.

19 Claims, 3 Drawing Sheets

AUTO TAB CONTROL SYSTEM

BACKGROUND OF THE INVENTION

1. Field of the Invention

This invention relates to a boat trim tab control system of hardware and software that combines to read inputs and adjust the trim tabs installed on the stern of said boat in order to facilitate several aspects of operational attitude optimization for the boat.

2. Description of Related Art

During the normal operation of many boats (or ships and other water borne vessels), it is common for factors such as boat design, weight distribution, and environmental conditions such as waves and weather to affect the boat's stability, efficiency, and safety. The ability of a boat and its operator to account and correct for problems caused by these factors has a significant impact on said boat's operation. For example, a listing problem can be caused by factors such as too much weight on either side of the boat or as the result of a wind. A boat that experiences a list will often have problems such as diminished lateral control and problems steering. In addition, a planing problem occurs when a boat takes too long or is unable to accelerate onto a plane and can be caused by a multitude of factors, including weight distribution and acceleration. A planing problem can result in problems such as a loss of visibility, reduced fuel efficiency, and poor velocity. Overall, the attitude of a boat in motion can affect performance, including fuel economy and lack of velocity, due to hull drag at different speeds in different sea states.

In order to address these problems, many boats use attitude trimming mechanisms. As a result, many trimming structures and methods have been introduced, including adjustable trim tabs that are attached to the stern of a boat. These trim tabs have been proven quite effective in controlling listing and planing problems and their structure is well know in the art.

Some trim tabs are only designed to provide ad hoc solutions. As a result, a boat's operator must constantly adjust their setting in response to changing wave, load, and speed conditions. In U.S. Pat. No. 6,167,830, the trim tab system is attached to the stern of a boat, wherein each trim tab is manually and individually controlled by the operator.

An automatic control for trim tabs is disclosed in U.S. Pat. No. 5,474,012. This system uses three on board sensors to automatically position the trim tabs in order to optimize the boat's operation. However, what is needed is a comprehensive trim tab control system that performs the functions of positioning trim tabs automatically in response to real time operating conditions and saving manual trim tab preferences and adjustments to enhance the overall performance of the boat under different environmental conditions.

SUMMARY OF THE INVENTION

A boat trim tab system having an automatic controller for positioning trim tabs automatically in response to real time operating conditions to enhance boat performance comprising a pair of trim tabs, at least one trim tab actuator, a keypad including a visual attitude display, and a master control module including accelerometers and a gyro that can calculate a needed trim tab adjustment and automatically adjust trim tabs to maintain the boat's position set by a programmed function or user selection and in response to varying the environmental conditions.

The Automatic Tab Control System ("ATCS") is intended to be a stand alone system that uses a control module to operate the system and a manual keypad to provide a user interface to the control module. In addition to its basic set of operational enhancement functions, the system is capable of providing additional enhancement functions on boats containing additional modules and an available serial bus communications protocol.

The control module uses a combination of at least two three axis accelerometers as motion sensors, a gyro scope as an attitude sensor, and a microcontroller that receives a constant signal from the motion and attitude sensors and is loaded with custom application software to execute the desired functions. At minimum, the control module can operate the basic functions of the ATCS on an analog protocol. These basic functions include Auto Vessel Positioning, Fuel Consumption Optimization, Auto Tab Retraction on Shutdown, and Manual Vessel Positioning and Saving. However, if the control module is connected to a serial bus communications protocol, the master control module is able to additionally operate the functions of Auto Tab Start Position and Auto Tab Retraction on Reverse (the tabs retract to a fully retracted position when the boat engine is put in reverse gear). The control module is also able to operate all functions through the serial bus communications protocol.

The keypad, with its visual position indicators, is the user interface to the ATCS and allows the user to set the function of the control module, manually control the boat position relative to the home position, and see the boat position relative to home position using the crosshairs. The keypad is a slave to the control module and communicates with the control module directly through a serial bus. The keypad has eight buttons with tactile feedback for setting system modes and manually actuating the tabs.

The ATCS constantly reads all available environmental outputs and actuates tabs as necessary to maintain the desired attitude for the function that has been manually selected or the position that has been automatically recalled. The basic set of functions requires additional components to provide the control module with a flow meter on the fuel line frequency output, an engine rpm with frequency output, a tachometer frequency output, and any manual output from the keypad to be input into the master control module. Enhanced functionality can be provided if the following environmental outputs are additionally available on the serial bus: a fuel consumption message, an engine speed message, a forward gear message, and a reverse gear message. Each respective function has a software application program within the control module that compiles the data from the environmental outputs relevant to performing the respective function and maintaining the desired position and can immediately provide a data output detailing the optimal trim tab location. When a function is selected, the control module uses the data output from that function's respective software application program to automatically adjust the position of each trim tab in order to optimize performance for said selected function or automatically maintain or to recall a manually entered position.

Using the present invention as a comprehensive system for automatic and manual trim tab controls allows for several types of optimized performance for a boat by enhancing the operation of trim tabs.

PREFERRED EMBODIMENT OF THE INVENTION

Figure 1:
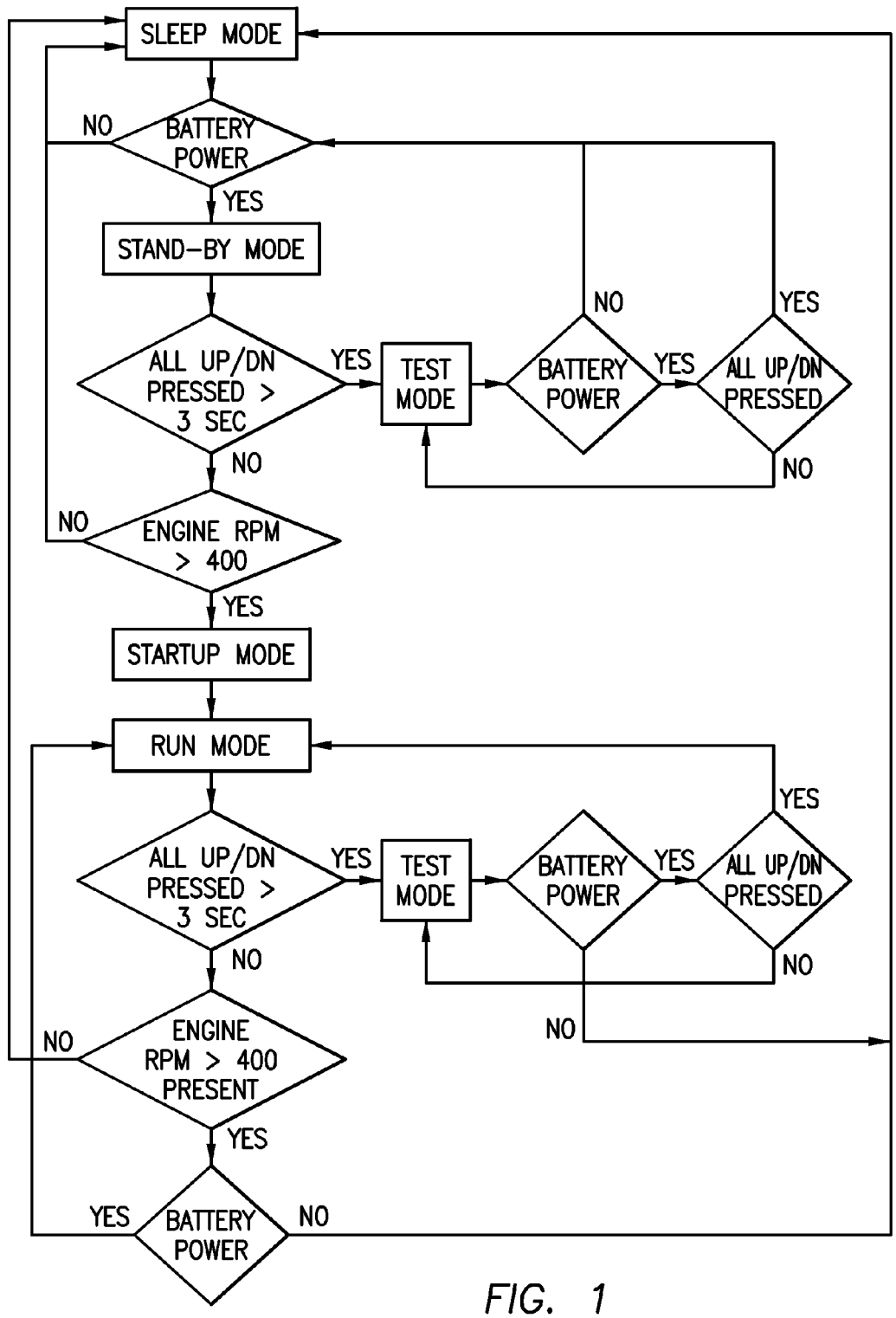
FIG. 1 is a flow chart detailing the ATCS start up.

The ATCS, built in accordance with the present invention, will now be described, with an initial reference to. The control module contains a microcontroller loaded with the application software that performs the functions of the ATCS. The control module also contains two three axis accelerometers and one gyro. The control modules user interface is the keypad, wherein said keypad will be discussed in greater detail later. The basis of the entire ATCS is that the control module can operate the trim tab actuators to extend or retract the trim tabs in order to maintain a desired attitude for achieving the desired outcome of a preset function or a manual adjustment. The control module performs this by receiving commands from the keypad and importing data from an analog communications protocol and a serial bus communications protocol, where available, and constantly running the data within the selected function's application software to determine the proper position of each trim tab.

The analog communications protocol of the control module provides the control module with information concerning engine rpm, fuel flow, and surface speed through frequency inputs from an engine control module, a flow meter on the fuel line, and a GPS system, respectively, in order to operate the basic functions of the ATCS. In addition, control module gets information regarding boat motion and attitude through the accelerometers and the gyro. the These basic functions include Auto Vessel Positioning, Fuel Consumption Optimization, Auto Tab Retraction on Shutdown and Manual Positioning and Saving.

In addition, the control module is able to receive information from the serial bus communications protocol, where available, which allows it to not only perform many of the analog functions with added redundancy, but also to perform additional functions not available in the analog communications protocol. The serial bus communications protocol allows for the control module to receive additional data from the engine control module regarding the boat's status, including a fuel consumption message, an engine speed message, a forward gear message, and a reverse gear message. These additional messages can be used by the control module to supplement the analog communications protocol in performing the Fuel Consumption Optimization, Auto Tab Retraction on Shutdown and Manual Positioning and Saving functions as well as to perform the additional functions of Auto Tab Start Position and Auto Tab Retraction on Reverse.

The control module and the keypad are designed to work on a vessel with a 12 or 24 volt direct current power supply. The max current per actuator that the control module can sustain is 20 Amps.

The serial bus communications protocol is made with the vessel multiplex network through Controller Area Network 1, an optoisolated Controller Area Network hardware for Smartcraft or NMEA2000/1939. The keypad will communicate through the vessel network on this channel or reside on a dedicated Controller Area Network 2 channel if no existing network backbone is present or Smartcraft is the only existing backbone.

While the control module is able to read analog engine rpm and fuel flow on two frequency inputs, it also has several spare inputs dedicated to various binary and analog circuits for future use. In addition, the control module can receive all of the necessary input from the serial bus communications protocol, where available.

The keypad is the user interface of the ATCS. It allows the user to set the functions of the control module, manually control vessel position relative to preset or manually saved home position, and see the vessel position relative to the home position. The keypad is a slave to the control module and communicates directly with it through a Controller Area Network bus using NMEA2000 protocol. The keypad's only connections are to the system through a four pin connector.

The keypad has a total of eight buttons with tactile feedback; four for manually actuating tabs and four for selecting system functions. The four manual actuation buttons on said keypad include a port tab "up" button, a starboard tab "up" button, a port tab "down" button and a starboard tab "down" button. On boats with two tab actuators are installed, the port tab "up" button and the starboard tab "up" button when pressed both act to extend the port and starboard tab that each button respectively corresponds to, generally causing the boat's bow to rise. Similarly, the port tab "down" button and the starboard tab "down" button when pressed both act to retract the port and starboard tabs that each button respectively corresponds to, generally causing the boat's bow to sink. On boats with only one tab actuator are installed, pressing either the port tab "up" button or the starboard tab "up" button acts to extend both the port and starboard tab, generally causing the boat's bow to rise. Similarly, the port tab "down" button and the starboard tab "down" button when pressed both acts to extend both the port and starboard tab, generally causing the boat's bow to sink.

The four function selecting buttons are used to select preset automatic functions of the ATCS. These buttons are labeled "ECON", "RIDE", "FAV1", and "FAV2". The "ECON" button is located on the upper left corner of the keypad and is pressed to select and actuate the Fuel Consumption Optimization function. The "ECON" button is the default active function on system startup. The "RIDE" button is located on the upper right corner of the keypad and is pressed to select and actuate the Auto Vessel Positioning function. The "FAV1" button and the "FAV2" button can be used after the vessel home position is changed manually to saved the new home position to be recalled later. The "FAV1" button is located on the lower left corner of the keypad. The "FAV2" button is located on the lower right corner of the keypad 20.

The keypad also has a plurality of colored LED's that serve as backlights. Relative to a user selectable dimmer setting, a brighter daytime intensity and dimmer night time intensity is set using the on board micro and photo sensor. All of the buttons are backlit using green LED's for location lighting at night. During the day, all buttons are not backlight as a default and will appear white to contrast with the black background. When a trim tab actuator is activated, either automatically by the control module or manually by pressing one of the manual control buttons, the backlight will change from green to red at night, or from off to red during the day, until the trim tab actuator completes its action. If a particular function is running, the backlight for the button for that function will change from green to red at night, or from off to red during the day. However, if the system is in manual setting, the backlight all of the buttons will be green at night or appear white during the day. In addition, the keypad includes a visual display that contains a series of LEDs centered on x, y, vertical and horizontal axes. These LEDs light green depending on the vessel's attitude relative to the home position. The home position is designated by a green LED at the point of intersection of the two axes. If the user manually adjusts the home position, the axes will track the delta from the home position by progressively lighting LEDs in the relevant direction away from the point of intersection. Once a new desired position is reached and the user stops manually adjusting the vessel's position, the new attitude of the vessel is saved as the new home position and the green LED at the point of intersection of the two axes will be lit again.

By selecting the "ECON" function button, the user activates the Fuel Consumption Optimization function. This function requires at minimum data from the accelerometers and the gyro, as well as the analog data from the flow meter on the fuel line with frequency output and the tachometer frequency output to properly function. However, it can also function by receiving the fuel consumption message and the engine speed message on the serial bus.

Figure 3:
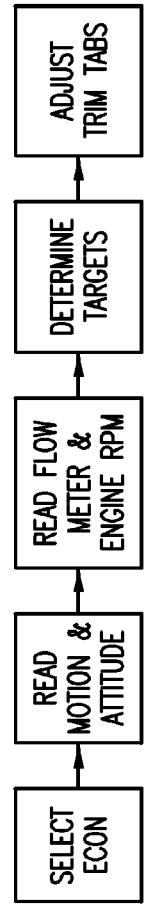
FIG. 3 is a flow chart detailing the ATCS fuel optimization mode with analog inputs.
Figure 4:
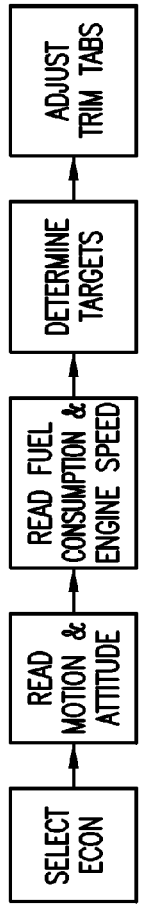
FIG. 4 is a flow chart detailing the ATCS fuel optimization mode with serial data bus inputs.

Referring now to FIGS. 3 and 4, the Fuel Consumption Optimization function is able to maximize fuel economy by adjusting trim settings in response to real time conditions. While performing this function, the main control module 10 reacts to an increase in engine rpm or engine speed by adjusting tabs to maximize speed and minimize fuel flow. To do this, it uses boat attitude data as well as either the fuel flow frequency data and tachometer frequency data or fuel consumption message data and engine speed message data. It minimizes angle of pitch allowed from the predetermined home position which will show on the keypad visual display. In addition, when the Fuel Consumption Optimization function is active, the control module will adjust the tabs to minimize listing from side to side due to weight shifting on the boat, wind, waves or other outside forces by minimizing the angle from the vertical, defined by gravity which it will show on the keypad. At any time, this function can be exited by pressing any of the other function buttons or a manual actuation button and it can be re-entered by pressing the "ECON" button.

Figure 5:
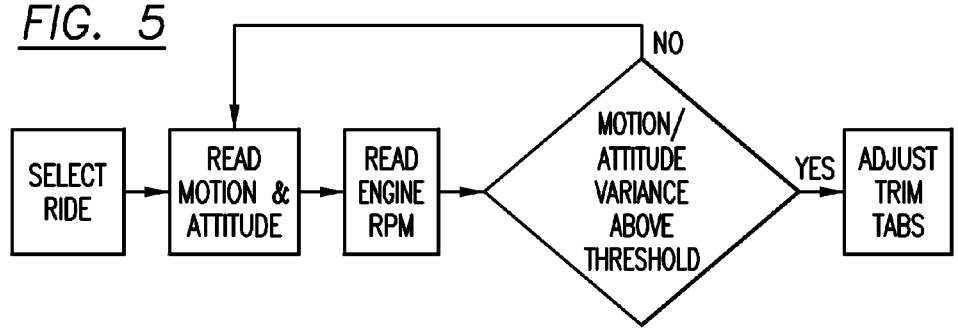
FIG. 5 is a flow chart detailing the ATCS automatic positioning mode with analog inputs.
Figure 6:
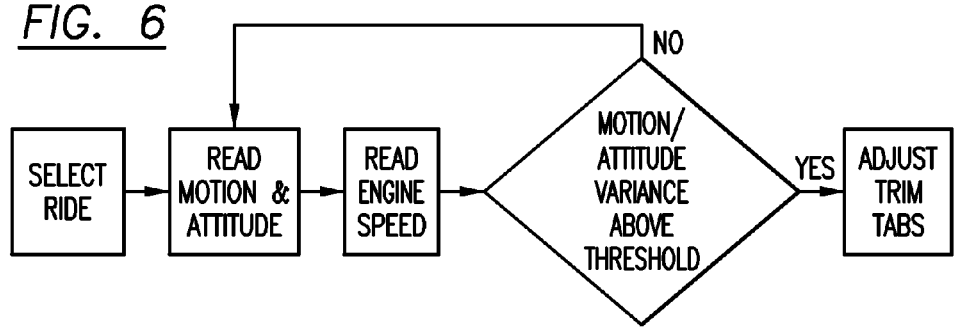
FIG. 6 is a flow chart detailing the ATCS automatic positioning mode with serial data bus inputs.

Referring now to FIGS. 5 and 6, the Auto Vessel Positioning function works to minimize variance from the home position. While performing this function, the control module reacts to an increase in engine rpm or engine speed by adjusting tabs to minimize the variance of average pitch angle while staying inside a predetermined window of speed. To perform this function, the control module uses data from the accelerometers and the gyro, as well as tachometer frequency data or engine speed message data. It will still show the variance from the home position on the keypad. Similar to the Fuel Consumption Optimization function, the control module while performing the Auto Vessel Positioning function will still adjust tabs to minimize listing from side to side due to weight shifting on the boat, wind, waves or other outside forces by minimizing the angle from the vertical, defined by gravity which it will show on the keypad.

A manual setting can be entered at any time by pressing any one of the manual actuation buttons. As soon as one of the manual actuation buttons is pressed, the control module 10 will stop automatically controlling the tabs and allow the user to manually adjust them away from the home position until the desired vessel attitude is reached. As the vessel angle deviates from the home position, it will be displayed on the keypad by progressively lighting the LEDs in the relevant direction further away from the center of the centered axis. However, if the manual buttons have not been used for greater than three seconds, the control module 10 will automatically save the new position as a manual home position and attempt to maintain that position. It will show this on the keypad by resetting this to the green center of the intersection of the axes.

Once the desired manual home position is reached and saved, this new home position can be stored by pressing either the "FAV1" button or the "FAV2" button on the keypad for three seconds. If this is done properly, the button that was pressed will flash red three times to confirm the position was stored. The stored position can then be recalled at any time by pressing the respective FAY button that was used to store than position. When a store position is recalled, the control module will automatically adjust the tabs as necessary to reach the recalled position.

Figure 7:
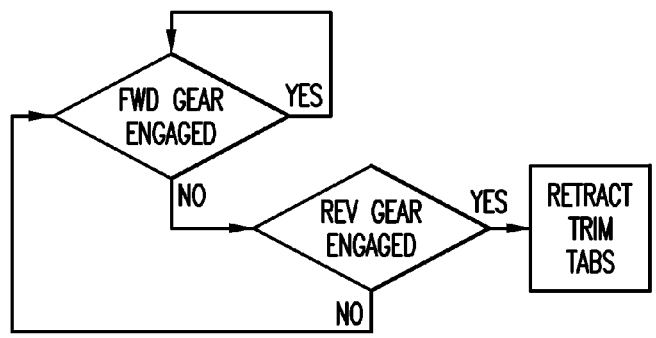
FIG. 7 is a flow chart detailing the ATCS automatic tab retraction on reverse mode.

Across all settings, there are certain general features that are shared and can be used at any time. The Temporary System Suspension in Turn feature is activated when an intended turn is detected by the on board motion sensors. This feature makes the main control module allow the vessel to list to avoid fighting the natural listing of the hull in a turn. The angle changes from the home position, however, will still be displayed on the keypad. The Auto Tab Start Position function is actuated if the serial bus communication protocol is available by sending a current gear message to the main control module when a forward gear is engaged. This signals the control module to fully extend the tabs. Referring now to FIG. 7, if serial bus communication protocol is available, Auto Tab Retraction on Reverse function causes the tabs to always retract to the fully retracted position if a reverse gear is engaged. The engaging of a reverse gear automatically sends a reverse gear message on the serial bus. Similarly, the Auto Tab Retraction on Shutdown function works by receiving an analog tachometer frequency output or serial bus message on engine speed. This function causes the control module 10 to retract all of the trim tabs when the engine speed or engine rpm drops below a predetermined threshold.

Figure 2:
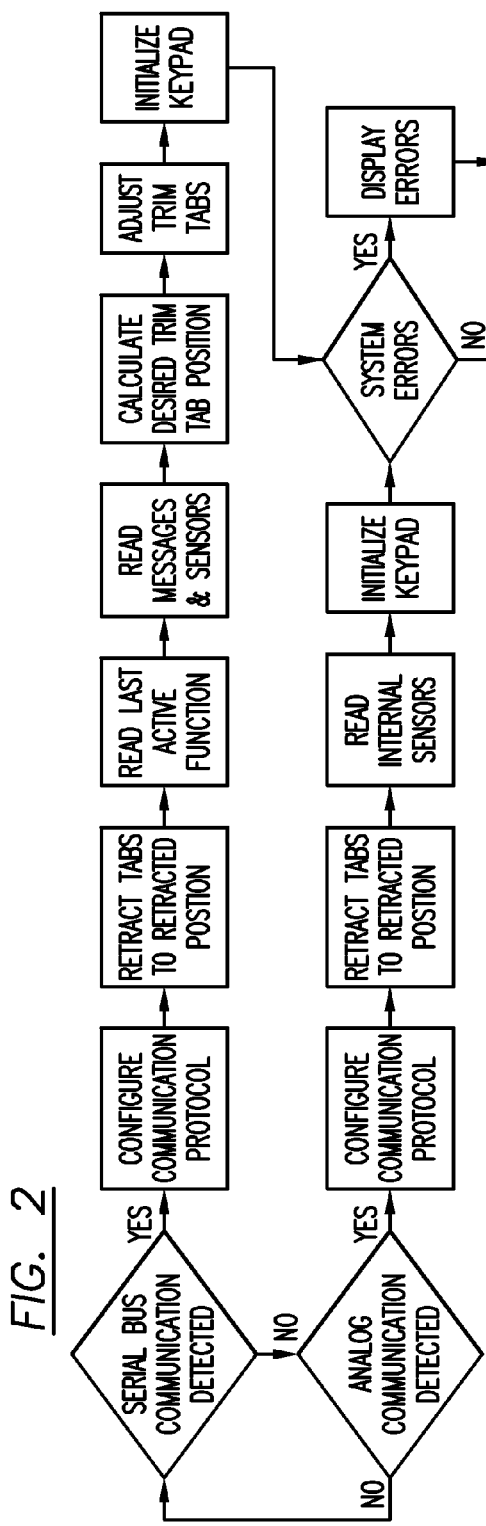
FIG. 2 is a flow chart detailing the ATCS initialization.

Referring now to FIGS. 1 and 2, the ATCS has several modes of its operation. Anytime battery power is not available, the ATCS goes into Sleep Mode. When the system is in Sleep Mode, the microprocessor is completely stopped. The ATCS automatically exits Sleep Mode whenever battery power is available. When the main control module leaves Sleep Mode, it first begins to control the local power supply by activating the power supply maintain output. It then enters Standby Mode.

In Standby Mode, the control module and the keypad appear to be in the same state as they did when they were in Sleep Mode. On the contrary, the main control module and the keypad actually have their power supply and are simply awaiting a stimulus to enter another mode, whether it be an active mode due to a user pressing a button or a loss of battery power, which would cause the control module and the keypad to go back to Sleep Mode.

The ATCS enters Test Mode, as long as the system has battery power, when all four manual actuator buttons are pressed for longer than three seconds. The system exits Test Mode when all four manual actuator buttons are pressed again. When in Test Mode, the system will not automatically adjust the tabs, only allow them to be manually operated. This is the only truly manual override mode to be used when installing to make sure the tabs actuate properly or to manually control the system in the event of a problem.

The ATCS enters Start-up Mode if the battery power is present and the main control module detects the engine rpm is greater than 400. Once in Start-up Mode, the main control module will calibrate the system by pulling both port and starboard tabs up to their fully retracted position and self calibrate vessel position. The port and starboard tabs are retracted up to their fully retracted position by running the tab actuators for a predetermined amount of time and the vessel position is self calibrated by returning the tabs to a set position depending on what function is active.

Next, the keypad is initialized by turning all button location backlights on full intensity for five seconds and then adjusting the backlight for day or night intensity. This process also turns on each of the crosshair LEDs on, one at a time, starting at the outside ends and progressing inward. Each crosshair LED is lit for no more than three seconds. The crosshair LED test will finish with the center intersection lit for home position.

The control module then configures itself for the appropriate communication protocol and ram configuration. It determines which devices and communications protocals are present (Smartcraft, NMEA2000, NMEA0183, 1939) and adjust inputs and communications accordingly.

The last step of Start-up Mode before Run Mode is entered involves checking for system errors. If the system detects errors during this startup sequence, the errors will be displayed on the keypad in the form of LED flash sequences. For the error "actuator max current exceeded," the LED behind the respective the actuator button that could not be started (port or starboard, "up" or "down") will flash six times at 2 Hz every three seconds. For the error "cannot achieve home position," the center intersection LED will flash six times at 2 Hz every three seconds. For the error "no comm protocol present," the LED behind the "ECON" and "RIDE" button will flash six times at 2 Hz every three seconds. For the error "Smartcraft license error (missing dongle)," the LED behind all for function buttons will flash six times at 2 Hz every three seconds. For the error "controller installed out of orientation tolerance," all LEDs will flash six times at 2 Hz every three seconds. These flash sequences will repeat until the user presses any button to acknowledge the error. Once the error is acknowledged, the ATCS will attempt to resume Run Mode.

Run Mode is active as long as the battery power is present and the engine rpm is greater than 400. Run Mode is the normal operational mode of the system and is the mode where the functions of the ATCS are performed. While in the mode, the user can select the preset functions, manually adjust the vessel's home position and save favorite positions to be recalled at a later time.

However, if the battery power goes below 9VDC, the main control module 10 will store the FAV1 home position, FAV2 home position, any error codes, and all configurations in the ATCS Electrically Erasable Programmable Read Only Memory before turning the supply off. Then, the control module will fully retract the port and starboard tabs and enter Sleep Mode.

The system can additionally account for and adjust trim tabs in response to user created environmental conditions. Ski boats that pull water skiers often include a hull attachment to generate waves behind the ski boat for the water skiers. The ATCS can be used to enhance and optimize the performance of the ski boat that is generating waves. The ATCS can enhance the performance ski boats even if the ski boat has a water ballast in the bow, center, or stern areas. The ATCS performs its selected function or maintains a selected attitude and automatically adjusts the trim tabs with a real time response even when the boat on which it is installed is creating environmental conditions that the ATCS has to correct for.

The control module 10 has two connector ports with different pin out options.

The ATCS communications protocol setup shows the analog communications protocol connections from the control module to the tab actuators, the engine control module, and the keypad.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An automatic trim tab control system for operation on a motored boat to positioning the boat trim for maximum engine efficiency, comprising:
    a power source;
    a control module, said control module comprising a computing device, at least two three axes accelerometers, and at least one gyroscope, said control module electrically connected to said power source;
    said computing device receiving motion data from said accelerometers and attitude data from said gyroscope;
    at least one trim tab actuator, each of said actuator electrically connected to said power source and said control module;
    at least one trim tab, mechanically connected to said at least one actuator;
    said trim tab actuator capable of moving said at least one trim tab, between an extended position and a retracted position;
    an engine revolution per minute measuring device, said engine revolution per minute measuring device electrically connected to said control module and capable of creating a rpm value based on a measurement of the revolutions per minute in the boat's engine and providing the rpm value to said computing device as rpm input data;
    a fuel output measuring device, said fuel output measuring device electrically connected to said control module and of capable creating a fuel value based on a measurement of the use of fuel by the boat and providing the fuel value to said computing device as fuel input data;
    an automated control software loaded onto said computing device, said automated control software including at least one trim tab application program that can receive electronic boat data, create a target position adjustment each trim tab based on values in the electronic boat data, and direct said trim tab actuators move each trim tab;
    a manual control keypad, said manual control keypad electrically connected to said control module;
    said keypad having two or more keypad buttons capable of manual actuation and controller circuitry, said controller circuitry capable of generating a keypad electrical signal in response to manual actuation of one or more of the keypad buttons;
    said keypad electrical signal capable of causing said trim tab actuator to move one or more of said trim tabs; and
    said keypad electrical signal capable of causing one of the trim tab application programs to execute.

2. The system of claim 1, wherein said keypad receives said motion data and said attitude data from said computing device.

3. The system of claim 2, wherein said keypad additionally comprises a visual output, wherein said visual output displays a value that corresponds to the value of said motion data and the value of said attitude data from said computing device.

4. The system of claim 1, wherein said rpm input data and said fuel input data are provided as analog frequencies.

5. The system of claim 4, wherein said trim tab application program comprises an auto positioning application and said electronic boat data comprises said rpm input data and said fuel input data, where said auto positioning application executes to prevent the attitude of the boat from changing.

6. The system of claim 4, wherein said trim tab application program comprises an fuel optimization application and said electronic boat data comprises said rpm input data and said fuel input data, where said fuel optimization application executes to adjust to the boat to the attitude that will minimize fuel flow at the engine's current revolutions per minute.

7. The system of claim 1, wherein said rpm input data and said fuel input data are provided over a serial bus protocol.

8. The system of claim 7, additionally comprising:
a gear measuring device, said gear measuring device electrically connected to said control module and capable of creating a gear direction value based on a measurement of the direction of the revolutions in the boat's engine and providing the gear direction value to said computing device over a serial bus protocol as gear direction input data; and
a global positioning depth input device, said global positioning depth input device electrically connected to said control module and capable of creating a GPS depth value based on a measurement of the boat's depth and providing the GPS depth value to said computing device over a serial bus protocol as GPS depth input data.

9. The system of claim 7, wherein said trim tab application program comprises an retract on reverse application and said electronic boat data comprises said rpm input data, said gear direction input data, and said fuel input data, where said retract on reverse application executes to retract trim tabs when the engine gear is in reverse.

10. A method of automatically controlling trim tabs deployed on a boat, comprising the steps of:
providing a power source;
providing a control module, said control module connected to said power source and comprising a computing device;
providing at least one trim tab actuator, each of said actuator electrically connected to said power source and said control module;
providing at least one trim tab, each of said trim tabs electrically connected to said at least one actuator, wherein said trim tab actuator is capable of moving one or more trim tabs, wherein to move trim tabs includes the extending of and the retracting of trim tabs;
measuring motion data, where motion data comprises a measurement of the boat's motion on at least two axes;
measuring attitude data, where attitude data comprises a measurement of the boat's attitude;
measuring rpm data, where rpm data comprises a measurement of the revolutions per minute on the boat's engine;
measuring fuel input data, where fuel input data comprises a measurement of the boat's fuel use;
providing an automated control software, said automated control software loaded onto said computing device, said automated control software including at least one trim tab application program that can receive electronic boat data, create a target position adjustment each trim tab based on values in the electronic data, and direct said trim tab actuators move each trim tab; and
providing a manual control keypad, said manual control keypad electrically connected to said control module said keypad having two or more keypad buttons capable of manual actuation and controller circuitry, said controller circuitry capable of generating a keypad electrical signal in response to manual actuation of one or more of the keypad buttons, said keypad electrical signal capable of causing said trim tab actuator to move one or more of said trim tabs, said keypad electrical signal capable of causing one of the trim tab application programs to execute.

11. The method of claim 10, wherein said keypad receives said motion data and said attitude data from said computing device.

12. The method of claim 11, wherein said keypad additionally comprises a visual output, wherein said visual output displays a value that corresponds to the value of said motion data and the value of said attitude data from said computing device.

13. The method of claim 10, wherein said rpm input data and said fuel input data are provided as analog frequencies.

14. The method of claim 13, wherein said trim tab application program comprises an auto positioning application and said electronic boat data comprises said rpm input data and said fuel input data, where said auto positioning application executes to prevent the attitude of the boat from changing.

15. The method of claim 13, wherein said trim tab application program comprises an fuel optimization application and said electronic boat data comprises said rpm input data and said fuel input data, where said fuel optimization application executes to adjust to the boat to the attitude that will minimize fuel flow at the engine's current revolutions per minute.

16. The method of claim 10, wherein said rpm input data and said fuel input data are provided over a serial bus protocol.

17. The method of claim 16, additionally comprising the step of:
measuring gear direction input data, wherein gear direction input data comprises a value identifying the direction of the revolutions in the boat's engine; and
measuring GPS depth input data, wherein GPS depth input data comprises a value measuring the boat's depth.

18. The system of claim 16, wherein said trim tab application program comprises an retract on reverse application and said electronic boat data comprises said rpm input data, said gear direction input data, and said fuel input data, where said retract on reverse application executes to retract trim tabs when the engine gear is in reverse.

19. An automatic trim tab control system for operation on a motored boat to positioning the boat trim for maximum engine efficiency, comprising:
a power source;
a control module, said control module comprising a computing device, at least two three axes accelerometers, and at least one gyroscope, said control module electrically connected to said power source;
said computing device receiving motion data from said accelerometers and attitude data from said gyroscope;
at least one trim tab actuator, each of said actuator electrically connected to said power source and said control module;
at least one trim tab, mechanically connected to said at least one actuator;
said trim tab actuator capable of moving said at least one trim tab, between an extended position and a retracted position;
an engine revolution per minute measuring device, said engine revolution per minute measuring device electrically connected to said control module and capable of creating a rpm value based on a measurement of the revolutions per minute in the boat's engine and providing the rpm value to said computing device as rpm input data;
a fuel output measuring device, said fuel output measuring device electrically connected to said control module and of capable creating a fuel value based on a measurement of the use of fuel by the boat and providing the fuel value to said computing device as fuel input data;

an automated control software loaded onto said computing device, said automated control software including at least one trim tab application program that can receive electronic boat data, create a target position adjustment each trim tab based on values in the electronic boat data, and direct said trim tab actuators move each trim tab;

a manual control keypad, said manual control keypad electrically connected to said control module;

said keypad having two or more keypad buttons capable of manual actuation and controller circuitry, said controller circuitry capable of generating a keypad electrical signal in response to manual actuation of one or more of the keypad buttons;

said keypad electrical signal capable of causing said trim tab actuator to move one or more of said trim tabs;

said keypad electrical signal capable of causing one of the trim tab application programs to execute;

wherein said keypad receives said motion data and said attitude data from said computing device;

wherein said keypad additionally comprises a visual output, wherein said visual output displays a value that corresponds to the value of said motion data and the value of said attitude data from said computing device;

wherein if said rpm input data and said fuel input data are provided as analog frequencies and said trim tab application program comprises an auto positioning application and said electronic boat data comprises said rpm input data and said fuel input data, where said auto positioning application executes to prevent the attitude of the boat from changing;

wherein if said rpm input data and said fuel input data are provided as analog frequencies and said trim tab application program comprises an fuel optimization application and said electronic boat data comprises said rpm input data and said fuel input data, where said fuel optimization application executes to adjust to the boat to the attitude that will minimize fuel flow at the engine's current revolutions per minute; and wherein if said rpm input data and said fuel input data are provided over a serial bus protocol and a gear direction input data is provided, said trim tab application program comprises an retract on reverse application and said electronic boat data comprises said rpm input data, said gear direction input data, and said fuel input data, where said retract on reverse application executes to retract trim tabs when the engine gear is in reverse, wherein said gear direction input data is gathered with a gear measuring device, said gear measuring device electrically connected to said control module and capable of creating a gear direction value based on a measurement of the direction of the revolutions in the boat's engine and providing the gear direction value to said computing device over a serial bus protocol as gear direction input data.

* * * * *